May 4, 1965   J. R. WEST ETAL   3,181,273
GROUND COVER
Filed June 7, 1962
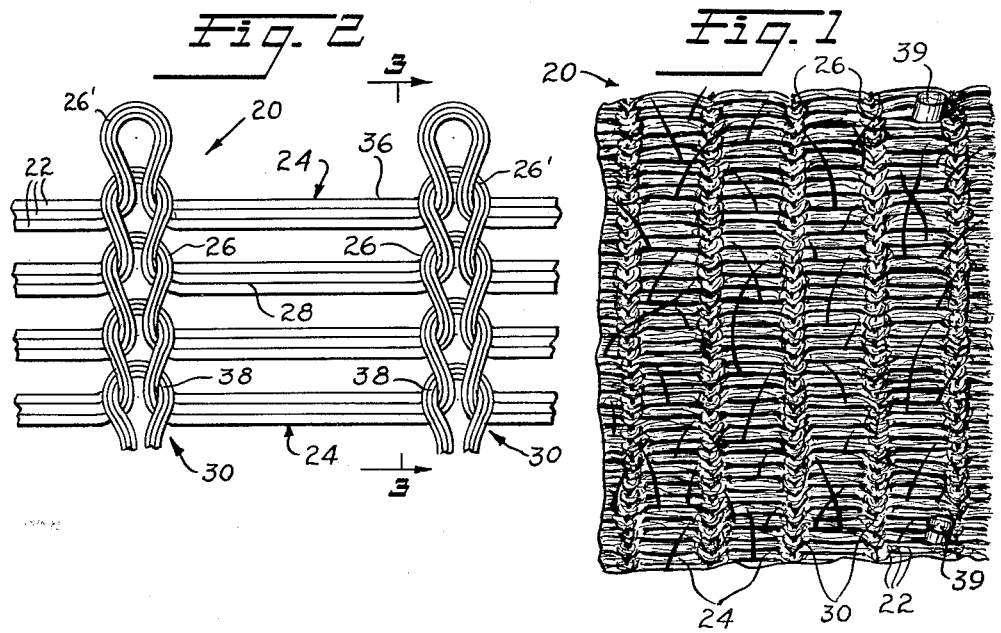
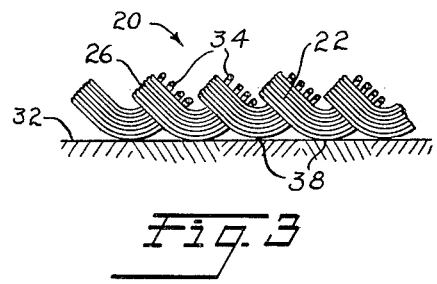
INVENTORS
JOHN R. WEST
RICHARD T. WESTFALL
BY *Strauch, Nolan & Neale*
ATTORNEYS United States Patent Office 3,181,273
Patented May 4, 1965

3,181,273
GROUND COVER
John R. West and Richard T. Westfall, Marysville, Ohio, assignors to the O. M. Scott & Sons Company, Marysville, Ohio, a corporation of Ohio
Filed June 7, 1962, Ser. No. 200,725
3 Claims. (Cl. 47—26)

This invention relates to ground covers and, more specifically, to ground covers for holding seeds and soil in place, minimizing abrupt fluctuations from normal and desirable gradual variations in soil temperature and for lessening the loss of moisture from the soil by evaporation. The invention is especially useful for protecting seeds, hastening germination, although it is by no means limited to this application.

For most effective germination, two environmental conditions, in most cases, must be established and maintained. First, the temperature of the seedbed soil must be maintained somewhere within a determinable range of values and many seeds require that the temperature be gradually cycled between minimum and maximum temperatures. The requisite variations in temperature must occur gradually since abrupt temperature fluctuations will tend to inhibit the germination process. Second, the seedbed soil must be kept moist. The latter condition in large part depends upon the maintenance of a relatively humid atmosphere adjacent the surface of the seedbed to prevent moisture from evaporating from its surface.

The optimum environmental conditions are, however, difficult to maintain. The soil temperature is affected by the temperature of the adjacent atmosphere and the latter may vary to a significant extent during the diurnal cycle and as the weather changes. And, as the temperature of the soil increases, increasing quantities of moisture will evaporate from its surface into the adjacent atmosphere.

Excessively low temperatures retard the germination of seed. And excessively high temperatures, such as generated by the hot midday and afternoon suns shining directly on the seedbed, and the resultant drying out of the seedbed due to evaporation losses may render the seed incapable of germinating or, subsequent to germination, causes a loss of the young seedlings.

Prior to the present invention, one method employed to maintain the desired environmental conditions of the seedbed was to cover the seedbed with a net or other open weave material. Nets, however, are primarily employed to prevent the seeds from washing away and do not provide the optimum control of seedbed temperature or the reduction in evaporation losses necessary for effective germination. Another disadvantage of the nets heretofore employed is that they are difficult, and sometimes impossible, to remove without dislodging the seedlings from the soil.

Another major method heretofore employed to provide uniform soil temperatures and to prevent excessive evaporation of moisture from the soil was to spread a mulch over the seedbed. Straw, peat moss, ground corn cobs, barley hulls, Vermiculite, and other light, particuluate materials have been employed for this purpose.

These mulches have a number of disadvantages. To effectively control evaporation of moisture from the seedbed, they must be uniformly and thinly spread. This presents several problems. In the first place, it is difficult to spread the mulch to a uniform depth. Furthermore, if the seedbed covers a large area, such as an entire lawn, the cost of the mulch may become prohibitive. And, quite important, if a non-degenerate mulch such as Vermiculite is employed, it may be undesirable to have the mulch remain on the seedbed after the germination process is completed but, at the same time, the mulch may be virtually impossible to remove.

Mulches, in addition, do not provide optimum control of the soil temperature in the seedbed because they are effected to a significant degree by the sun's radiant energy and the temperature of the adjacent air in the same manner as the seedbed soil itself.

Mulches of the type described above are also susceptible to wind and rain which will readily blow or wash them away together with the seed over which they are spread.

These mulches cannot readily be reused since, as was discussed above, it is practically impossible to recover them from the seedbed after the germination process is complete and the plants are established. This is a further disadvantage of substantial significance.

It is a primary object of the present invention to provide novel ground covers which are vastly superior to the covers and mulches heretofore employed for protecting seeds, promoting seed germination, and producing plants having deep penetrating root systems.

The ground cover provided by the present invention consists generally of a mat or sheet of louvered material. In the preferred embodiment the louvered cover is knitted from strands of wet strength paper. A special knit is employed in which groups of preferably four strands are bunched together to form the louvers and in which ridges extending normal to the louvers are provided. The ridges support the cover slightly above the surface of the seedbed, providing what may be termed a "micro-climate" between the cover and the seedbed surface. These ridges, in addition, prevent the louvers from sticking to or becoming embedded in the soil.

Another object of the present invention, therefore, is to provide louvered ground covers which, when properly oriented in relation to the sun's path, will shade the seedbed during the heat of the day to maintain the temperature of the soil of the seedbed uniform, and provide a beneficial decrease in the rate at which moisture evaporates from the ground surface.

It is another object of the present invention to provide ground covers on which moisture will tend to condense to thereby increase the humidity of the air next adjacent the surface of the seedbed.

Another object of the present invention resides in the provision of ground covers which will reduce slaking of the soil surface by sheltering the soil from the beating effect of hard rains.

It is yet another object of the present invention to provide ground covers which will prevent blowing and washing of seeds and soil.

Another object of the present invention is the provision of novel ground covers which can be removed from a seedbed without pulling out or otherwise disturbing the seedlings.

A further object of the present invention is to provide ground covers which will provide temporary surfaces over seeded areas to permit the movement of sprinklers and other equipment needed in caring for new seedlings.

Another object of the present invention is the provision of re-useable ground covers.

Yet another object of the present invention resides in the provision of novel methods for promoting the germination of seeds.

Other objects and further novel features of the present invention will become apparent from the appended claims and as the ensuing detailed description and discussion proceeds in conjunction with the accompanying drawings, in which:

FIGURE 1 is a plan view of a seedbed covered with a louvered ground cover fabricated in accordance with the principles of the present invention.

FIGURE 2 is a bottom view of the preferred embodiment of ground cover provided by the present invention; and FIGURE 3 is a sectional view of the ground cover of FIGURE 2 and is taken substantially along line 3—3 of that figure.

Referring now to the drawings, FIGURES 1–3 illustrate a preferred embodiment of ground cover incorporating the present invention. The cover 20 illustrated in these figures is knitted from strands 22 of wet strength paper which are preferably relaxed during the knitting process to reduce shrinkage and curling of the cover 20 when it becomes wet.

In the preferred knit illustrated in FIGURES 2 and 3, parallel groups 24 of four strands are provided. At equidistant intervals, the strands 22 in each group 24 are deformed to provide loops 26. The loops 26 of one group 24 extend upwardly through juxtaposed loops 26' of the adjacent group 24. The plural strands in the parallel groups provide, as will be described in detail in the ensuing paragraphs, laterally extending stranded slatlike louvers 28 and longitudinally extending ribs 30 which support the louvers 28 spaced slightly above the ground surface 32, establishing a micro-climate between the ground surface and the cover. Additionally, the wet-strength paper strands, knit as described above, provide a non-raveling net, permitting the cover to be cut into appropriately sized portions without the necessity of binding or otherwise treating the cut edges.

Referring now specifically to FIGURE 3, each loop 26 is supported by the adjacent loop 26' through which it extends at an angle of preferably 40–50° to the ground surface, providing a supporting surface 34 at this same angle. The intermediate portions 36 of each group of strands 22 are supported, at their opposite ends, on surfaces 34 of the loops of adjacent groups of strands in closely spaced side-by-side planar relationship. The strands 22 retain substantially the same planar disposition throughout the stretch between loops, each group 24 of four strands 22 thereby providing a louver 28 inclined at 40–50° to ground surface 32.

The lowermost portion 38 of loops 26 engage ground surface 32. As the loops 26 of the succeeding groups of strands 24 are aligned, the loop portions 38 form ribs 30 which, as indicated above, support louvers 28 slightly above the ground surface.

Ground cover 20 is laid with the openings between adjacent louvers 28 facing the direction of the weakest sun rays and, as in FIGURE 1, may be fastened in place by pegs 38. Few, if any, of the weak rays will be blotted out. As the sun moves along its diurnal path and its rays become more intense, an increasing proportion of them will be intercepted by the ground cover and reflected. Conversely, as the sun's rays again become less intense, increasing proportions of sunlight impinging on ground cover 20 may pass between the louvers 28, depending upon its disposition.

The blotting of the sun's rays during the warmer portions of the day tend to hold down the temperature of the seedbed soil and, as a result, the rate at which moisture evaporates from its surface. In addition, ribs 30 by supporting the louvers 28 above the surface 32 of the ground, permit air to circulate between ground cover 20 and the ground surface. The circulating air further reduces the ground temperature and the evaporation of moisture from its surface.

During the night and the early morning, when the ambient temperatures are lower, moisture evaporating from the soil will strike the downwardly directed surfaces of ground cover 20 and condense. Each tiny droplet condensing on the ground cover will act as a miniature condenser, condensing out further water vapor from the adjacent atmosphere and increasing the size of the droplet. As the process continues the droplet will increase to a size where it will drop off the ground cover louver strands onto the soil. This mechanism effects a substantial return of evaporating moisture to the soil.

In the illustrated embodiment, the strands 22 are 1/64" in diameter. Loops 26 are 1/8" in width and are spaced 1/2" apart. The cover 20 is 1/8" deep. This provides a cover which in addition to establishing optimum conditions for seed germination, is durable and rugged. Cover 20 may, therefore, be taken up and re-used and, when in place, provides a surface for light traffic over the seedbed, permitting the movement of sprinklers and other equipment necessary in caring for a new seeding.

Another advantage of the novel ground cover 20 is that it prevents seed sown on the ground surface from being blown or washed away and substantially eliminates slaking. Slaking is the breaking up of agglomerated soil particles by the beating effect of a driving rain and is detrimental to the development of a new seeding.

Still another advantage of the novel ground cover 20 is that it may readily be removed after the germination period is completed without dislodging or pulling out the seedlings.

Numerous modifications may be made in ground cover 20 without exceeding the scope of the present invention. Fewer or more strands 22 may be used in each of the groups 24. The spacing between ribs 30, the diameter of strands 22, and the angle at which louvers 28 are inclined may all be varied as desired or as deemed appropriate for particular applications.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A ground cover to protect seeds and the like, said ground cover being a knitted fabric comprised of an array of multiple strand bundles in parallel, side-by-side relationship, loops formed in each of said bundles at regularly spaced intervals with the loops of successive bundles aligned in rows normal to said strands, each of said loops extending through a loop of the next adjacent bundle to fix said bundles into a coherent structure, said loops each having a first portion extending to one side of said array to form a ground engaging projection whereby the first loop portions of each row of loops provide a rib for supporting the portions of said strands between adjacent rows of loops in spaced relationship above the surface engaged by said first loop portions, and a second loop portion inclined at an angle to said first loop portion and toward said array, the angularly inclined second loop portions of the loops in each of said bundles engaging and deforming those portions of the strands in the next adjacent bundle between the loops therein into slatlike louvers having a width substantially greater than the diameter of said strands and inclined at substantially equal angles to a plane tangent to said second loop portions, whereby said louvers are supported slightly above and are inclined at an angle to a surface supporting said ground cover and engaged by said ribs and said louvers shade, and provide a microclimate above, said surface.

2. The knitted fabric as defined in claim 1, wherein said louvers are formed by at least three strands.

3. The knitted fabric as defined in claim 1, wherein the material from which said strands are knit is wet strength paper.

(References on following page)

References Cited by the Examiner

UNITED STATES PATENTS

| | | | |
|---|---|---|---|
| Re. 23,603 | 12/52 | Rohs et al. | 47—26 |
| 188,570 | 3/77 | Beidler | 47—26 |
| 853,862 | 5/07 | Buck et al. | 98—121 XR |
| 2,492,909 | 12/49 | Warp | 98—121 |
| 2,721,462 | 10/55 | Marks. | |
| 2,759,413 | 8/56 | Smith | 98—121 |
| 2,856,324 | 10/58 | Janowski | 156—65 |
| 2,974,442 | 3/61 | Womelsdorf | 47—26 |

FOREIGN PATENTS

| | | |
|---|---|---|
| 846,179 | 8/52 | Germany. |
| 31,127 | 7/11 | Sweden. |

ABRAHAM G. STONE, *Primary Examiner.*

T. GRAHAM CRAVER, *Examiner.*